United States Patent
Kim et al.

(10) Patent No.: US 7,991,096 B1
(45) Date of Patent: Aug. 2, 2011

(54) DATA SAMPLING METHOD AND APPARATUS USING THROUGH-TRANSITION COUNTS TO REJECT WORST SAMPLING POSITION

(75) Inventors: Bruce Kim, Los Altos, CA (US); Hoon Choi, Mountain View, CA (US); Gyudong Kim, Sunnyvale, CA (US)

(73) Assignee: Silicon Image, Inc., Sunnyvale, CA (US)

( * ) Notice: Subject to any disclaimer, the term of this patent is extended or adjusted under 35 U.S.C. 154(b) by 2407 days.

(21) Appl. No.: 10/842,231

(22) Filed: May 10, 2004

Related U.S. Application Data (60) Provisional application No. 60/475,032, filed on Jun. 2, 2003.

(51) Int. Cl.
*H04L 7/00* (2006.01)
(52) U.S. Cl. ........................................... 375/355
(58) Field of Classification Search .................. 375/355
See application file for complete search history.

(56) References Cited

U.S. PATENT DOCUMENTS

| | | | |
|---|---|---|---|
| 5,905,769 A | 5/1999 | Lee et al. | 375/376 |
| 6,560,290 B2 * | 5/2003 | Ahn et al. | 375/259 |
| 7,062,004 B1 * | 6/2006 | Kim et al. | 375/371 |
| 2003/0169831 A1 * | 9/2003 | Neugebauer et al. | 375/316 |

* cited by examiner

*Primary Examiner* — Shuwang Liu
*Assistant Examiner* — Michael R Neff
(74) *Attorney, Agent, or Firm* — Girard & Equitz LLP

(57) ABSTRACT

A data sampling circuit that employs an oversampling clock to oversample a data signal, a phase tracking circuit for use in such a sampling circuit, and a receiver and system including such a sampling circuit. Preferably, phase tracking is implemented by systematically identifying and rejecting at least one worst sampling position, and sampling the data signal at a non-rejected sampling position. Preferably, phase tracking is accomplished by counting through-transitions of edges of the sampled data signal through each oversampling position, and rejecting an oversampling position having a highest count of through-transitions. In some embodiments, different phase tracking methods (at least one of which includes the step of generating through-transition counts) are used for different types of input data. Other aspects of the invention are methods for determining an oversampling position for oversampling a data signal, and methods for oversampling a data signal including by generating through-transition counts.

39 Claims, 3 Drawing Sheets

DATA SAMPLING METHOD AND APPARATUS USING THROUGH-TRANSITION COUNTS TO REJECT WORST SAMPLING POSITION

CROSS-REFERENCE TO RELATED APPLICATION

This application claims the benefit of U.S. Provisional Application No. 60/475,032, filed Jun. 2, 2003, entitled "DATA SAMPLING METHOD AND APPARATUS USING THROUGH-TRANSITION COUNTS TO REJECT WORST SAMPLING POSITION."

FIELD OF THE INVENTION

The invention pertains to methods and circuitry for oversampling data (e.g., data received over high speed serial links). In some embodiments, the invention is a method and apparatus for oversampling encoded data that have been transmitted over a transition minimized differential signaling ("TMDS") link, or a link having some but not all of the characteristics of a TMDS link, or another serial link.

BACKGROUND OF THE INVENTION

The term "receiver" is used herein in a broad sense to denote any device capable of receiving and decoding data that has been transmitted over a serial link or other link (and optionally also performing additional functions, which can include decrypting the received data and other operations related to decoding, reception, or decryption of the received data). For example, the term receiver can denote a transceiver that performs the functions of a transmitter as well as the functions of a receiver.

It should be understood that the terms "data" and "data signal" are used in a broad sense herein (in the context of sampling of "data" or a "data signal") to denote any signal. Examples of a data signal are a signal indicative of a clock, and a signal indicative of an arbitrary sequence of binary bits of information (also referred to as binary bits of data).

Various serial links for transmitting data and clock signals are well known.

One conventional serial link, used primarily for high-speed transmission of video data from a host processor (e.g., a personal computer) to a monitor, is known as a transition minimized differential signaling interface ("TMDS" link). The characteristics of a TMDS link include the following:

1. video data are encoded and then transmitted as encoded words (each 8-bit word of digital video data is converted to an encoded 10-bit word before transmission);
    a. the encoding determines a set of "in-band" words and a set of "out-of-band" words (the encoder can generate only "in-band" words in response to video data, although it can generate "out-of-band" words in response to control or sync signals. Each in-band word is an encoded word resulting from encoding of one input video data word. All words transmitted over the link that are not in-band words are "out-of-band" words);
    b. the encoding of video data is performed such that the in-band words are transition minimized (a sequence of in-band words has a reduced or minimized number of transitions);
    c. the encoding of video data is performed such that the in-band words are DC balanced (the encoding prevents each transmitted voltage waveform that is employed to transmit a sequence of in-band words from deviating by more than a predetermined threshold value from a reference potential. Specifically, the tenth bit of each "in-band" word indicates whether eight of the other nine bits thereof have been inverted during the encoding process to correct for an imbalance between running counts of ones and zeroes in the stream of previously encoded data bits);

2. the encoded video data and a video clock signal are transmitted as differential signals (the video clock and encoded video data are transmitted as differential signals over conductor pairs);

3. three conductor pairs are employed to transmit the encoded video, and a fourth conductor pair is employed to transmit the video clock signal; and 4. signal transmission occurs in one direction, from a transmitter (typically associated with a desktop or portable computer, or other host) to a receiver (typically an element of a monitor or other display device).

A use of the TMDS serial link is the "Digital Visual Interface" interface ("DVI" link) adopted by the Digital Display Working Group. It will be described with reference to FIG. 1. A DVI link can be implemented to include two TMDS links (which share a common conductor pair for transmitting a video clock signal) or one TMDS link, as well as additional control lines between the transmitter and receiver. The DVI link of FIG. 1 includes transmitter 1, receiver 3, and the following conductors between the transmitter and receiver: four conductor pairs (Channel 0, Channel 1, and Channel 2 for video data, and Channel C for a video clock signal), Display Data Channel ("DDC") lines for bidirectional communication between the transmitter and a monitor associated with the receiver in accordance with the conventional Display Data Channel standard (the Video Electronics Standard Association's "Display Data Channel Standard," Version 2, Rev. 0, dated Apr. 9, 1996), a Hot Plug Detect (HPD) line (on which the monitor transmits a signal that enables a processor associated with the transmitter to identify the monitor's presence), Analog lines (for transmitting analog video to the receiver), and Power lines (for providing DC power to the receiver and a monitor associated with the receiver). The Display Data Channel standard specifies a protocol for bidirectional communication between a transmitter and a monitor associated with a receiver, including transmission by the monitor of an Extended Display Identification ("EDID") message that specifies various characteristics of the monitor, and transmission by the transmitter of control signals for the monitor. Transmitter 1 includes three identical encoder/serializer units (units 2, 4, and 6) and additional circuitry (not shown). Receiver 3 includes three identical recovery/decoder units (units 8, 10, and 12) and inter-channel alignment circuitry 14 connected as shown, and additional circuitry (not shown).

Figure 1:
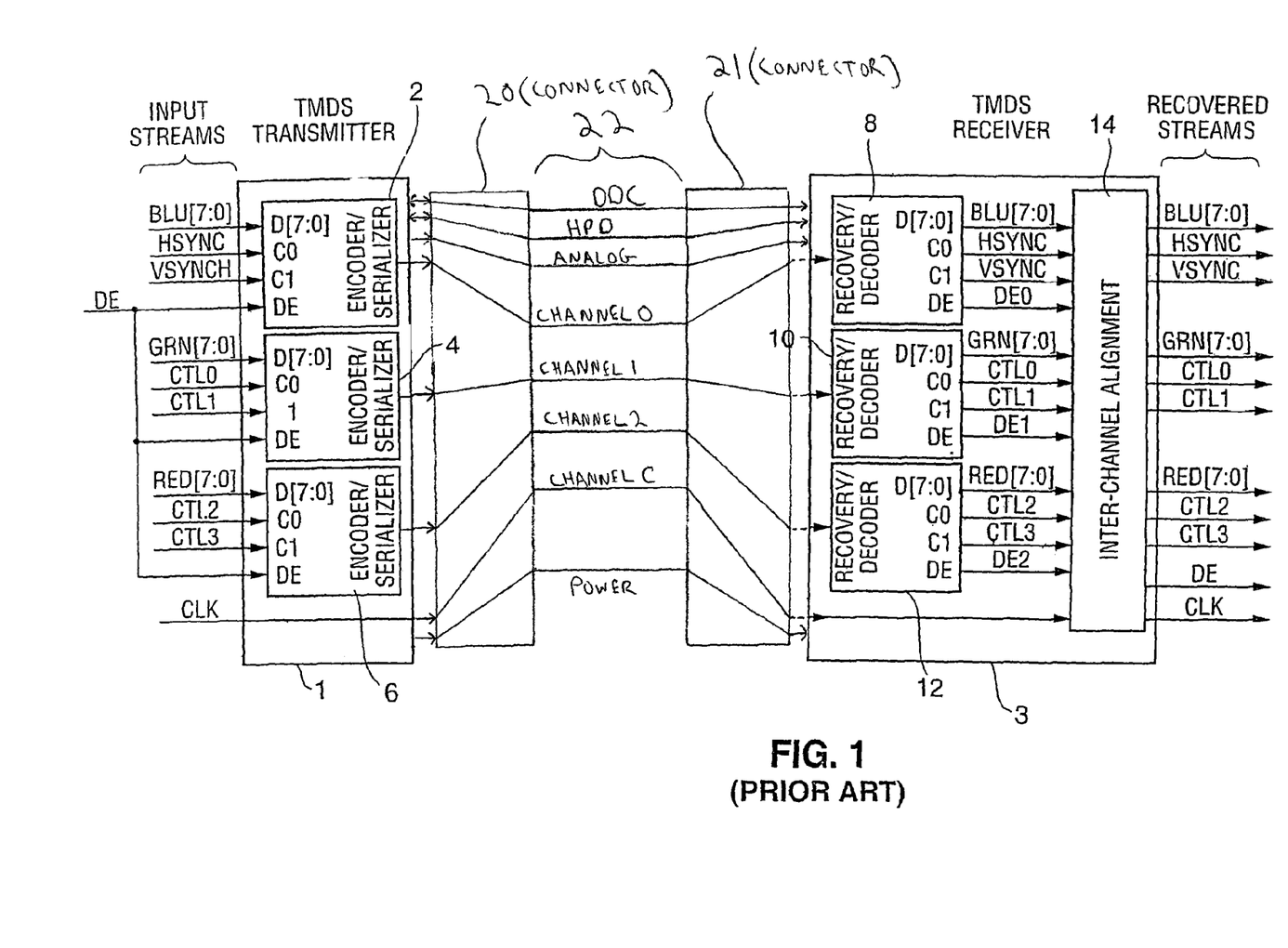
FIG. 1 is a block diagram of a conventional system for transmitting a data signal (indicative of encoded data) over a serial link and oversampling the received data signal.

As shown in FIG. 1, circuit 2 encodes the data to be transmitted over Channel 0, and serializes the encoded bits. Similarly, circuit 4 encodes the data to be transmitted over Channel 1 (and serializes the encoded bits), and circuit 6 encodes the data to be transmitted over Channel 2 (and serializes the encoded bits). Each of circuits 2, 4, and 6 responds to a control signal (an active high binary control signal referred to as a "data enable" or "DE" signal) by selectively encoding either digital video words (in response to DE having a high value) or a control or synchronization signal pair (in response to DE having a low value). Each of encoders 2, 4, and 6 receives a different pair of control or synchronization signals: encoder 2 receives horizontal and vertical synchronization signals (HSYNC and VSYNC); encoder 4 receives control bits CTL0 and CTL1; and encoder 6 receives control bits CTL2 and CTL3. Thus, each of encoders 2, 4, and 6 generates in-band words indicative of video data (in response to DE having a high value), encoder 2 generates out-of-band words indicative of the values of HSYNC and VSYNC (in response to DE having a low value), encoder 4 generates out-of-band words indicative of the values of CTL0 and CTL1 (in response to DE having a low value), and encoder 6 generates out-of-band words indicative of the values of CTL2 and CTL3 (in response to DE having a low value). In response to DE having a low value, each of encoders 4 and 6 generates one of four specific out-of-band words indicative of the values 00, 01, 10, or 11, respectively, of control bits CTL0 and CTL1 (or CTL2 and CTL3).

Each of the out-of-band control words (indicative of CTL0 and CTL1, or CTL2 and CTL3) is encoded as a 10-bit, transition-maximized code word indicative of two control bits (CTL0 and CTL1, or CTL2 and CTL3). Each of the out-of-band sync words (indicative of HSYNC and VSYNC) is encoded as a 10-bit, transition-maximized code word indicative of two sync bits (HSYNC and VSYNC).

In operation of the FIG. 1 system, a cable comprising connectors 20 and 21 and conductors 22 is connected between transmitter 1 and receiver 3. Conductors 22 include a conductor pair for transmitting serialized data over Channel 0 from encoder 2 to decoder 8, a conductor pair for transmitting serialized data over Channel 1 from encoder 4 to decoder 10, a conductor pair for transmitting serialized data over Channel 2 from encoder 6 to decoder 12, and a conductor pair for transmitting a video clock over Channel C from transmitter 1 to receiver 3. Conductors 22 also include wires for the DDC channel (which can be used for bidirectional I2C communication between transmitter 1 and receiver 3), a Hot Plug Detect (HPD) line, "Analog" lines for analog video transmission from transmitter 1 to receiver 3, and "Power" lines for provision of power from transmitter 1 to a receiver 3.

In the FIG. 1 system, the frequency of the video clock signal transmitted over Channel C is typically one-tenth the bit rate at which data transmission occurs over each of the data channels (Channels 0, 1, and 2), in the sense that ten data bits are transmitted over each data channel during each video clock period. This can be accomplished by employing nine delay cells in the transmitter to generate nine multiphase delayed versions of the video clock, and using the nine delayed versions of the video clock (each having a different phase) together with the video clock itself to transmit data over each of Channels 0, 1, and 2, at a rate of ten bits per video clock period.

In receiver 3, the data signal received on Channel 0 is sampled in unit 8, the data signal received on Channel 1 is sampled in unit 10, and the data signal received on Channel 2 is sampled in unit 12. The samples are decoded to recover data, control, or sync bits, and the decoded bits are asserted to circuitry 14.

Another serial link is the "High Definition Multimedia Interface" interface (sometimes referred to as an "HDMI" link or interface) developed Silicon Image, Inc., Matsushita Electric, Royal Philips Electronics, Sony Corporation, Thomson Multimedia, Toshiba Corporation, and Hitachi.

Other serial links include the set of serial links known as Low Voltage Differential Signaling ("LVDS") links (e.g., "LDI," the LVDS Display Interface), each of which satisfies the TIA/EIA-644 standard or the IEEE-1596.3 standard, ethernet links, fiberchannel links, serial ATA links used by disk drives, and others.

Throughout the specification the expression "TMDS-like link" will be used to denote a serial link capable of transmitting encoded data (e.g., encoded digital video data) and a clock for the encoded data, from a transmitter to a receiver, and also capable of transmitting (bidirectionally or unidirectionally) one or more additional signals (e.g., encoded digital audio data or other encoded data) between the transmitter and receiver, that is or includes either a TMDS link or a link having some but not all of the characteristics of a TMDS link. Examples of TMDS-like links include links that differ from TMDS links only by encoding data as N-bit code words (e.g., with N≠10) that are not 10-bit TMDS code words, and links that differ from TMDS links only by transmitting encoded video over more than three or less than three conductor pairs. There are several conventional TMDS-like links.

Some TMDS-like links encode input video data (and other data) to be transmitted into encoded words comprising more bits than the incoming data using a coding algorithm other than the specific algorithm used in a TMDS link, and transmit the encoded video data as in-band characters and the other encoded data as out-of-band characters. The characters need not be classified as in-band or out-of-band characters based according to whether they satisfy transition minimization and DC balance criteria. Rather, other classification criteria could be used. An example of an encoding algorithm, other than that used in a TMDS link but which could be used in a TMDS-like link, is IBM 8b10b coding. The classification (between in-band and out-of-band characters) need not be based on just a high or low number of transitions. For example, the number of transitions of each of the in-band and out-of-band characters could (in some embodiments) be in a single range (e.g., a middle range defined by a minimum and a maximum number of transitions).

The data transmitted between the transmitter and receiver of a TMDS-like link can, but need not, be transmitted differentially (over a pair of conductors). Also, although a TMDS link has four differential pairs (in the single pixel version), three for video data and the other for a video clock, a TMDS-like link could have a different number of conductors or conductor pairs.

Typically, the primary data transmitted by a TMDS link are video data. What is often significant about this is that the video data are not continuous, and instead have blanking intervals. These blanking intervals provide an opportunity (exploited in some embodiments of the present invention) for auxiliary data to be transported, and they represent unused bandwidth. However, many serial links do not transmit data having blanking intervals, and thus do not encode input data (for transmission) in response to a data enable signal. For example, audio serial links would typically transmit continuous data.

The expression "auxiliary data" is used in a broad sense herein to denote digital audio data or any other type of data other than video data and timing information for video data (e.g., a video clock). For example, timing information for audio data (e.g., a clock for recovering transmitted audio data) falls within the scope of "auxiliary data."

To recover data transmitted over links (e.g., TMDS-like or other serial links), the received data signals are often oversampled. Phase tracking has an important role in data recovery (e.g., recovery of high-speed serial data) performed by blind oversampling systems. Phase tracking determines the relative phase of a received data signal and the clock employed to oversample the data signal, and is useful to assist in picking the best sampling position (i.e., the best relative phase between the data signal and the clock edges at which the data signal is sampled). Most conventional phase tracking algorithms implemented by blind oversampling systems use raw transition edge information to choose the best sampling position. In some conventional phase tracking algorithms, filtering is applied to the raw transition information to reject some errors that would otherwise result from the phase tracking (in the absence of such filtering).

A conventional phase tracking algorithm that uses raw transition edge information is described in U.S. Pat. No. 5,905,769, issued May 18, 1999. The circuitry described with reference to FIG. 6 of U.S. Pat. No. 5,905,769 implements a phase tracking algorithm in connection with 3× oversampling of a data signal having a data period equal to 1/(the data signal's bit rate), and employs a digital PLL circuit to accomplish phase alignment of the oversampling clock with the data signal and to select one "best" sample of each set of three samples obtained per data period.

SUMMARY OF THE INVENTION

In a class of embodiments, the invention is a data sampling circuit that employs an oversampling clock to oversample a data signal. In at least one operating mode, the circuit implements phase tracking by systematically identifying and rejecting at least one worst sampling position (typically a single worst sampling position), and samples the data signal at a non-rejected sampling position. Preferably, the circuit is configured to identify and reject a worst sampling position, and then to reject each succeeding next-worst sampling position until one non-rejected sampling position remains, and samples the data signal at the one non-rejected sampling position (which is assumed to be the best sampling position).

In another class of embodiments, the invention is a phase tracking circuit for use in such a data sampling circuit.

By using information regarding edges of an oversampled data signal to reject at least one "worst" oversampling position, rather than using such information to identify a "best" sampling edge directly, typical embodiments of the invention allow the best oversampling position (or at least an adequate oversampling position) to be found quickly using minimal hardware.

In preferred embodiments of the invention, phase tracking is accomplished by counting "through-transitions" of edges of the sampled data signal through each "oversampling position." The expression "oversampling position" assumes that the data signal has a data period, P (where P=(the data signal's bit rate)$^{-1}$), although the data signal need not be (and is typically not) indicative of a periodic sequence of data bits (e.g., a sequence of alternating one and zero bits). The expression "oversampling position" also assumes that multiple samples of the data signal are obtained during each data period, each sample in response to an oversampling clock edge having a different phase. Specifically, the expression "oversampling position" (or the expression "sampling position" or "sampler," each sometimes used herein as a synonym for "oversampling position") denotes all edges of the oversampling clock that have the same phase. One edge of each sampling position (of an oversampling clock) occurs during each data period, assuming that the data signal is not subject to jitter (so that the data period does not change with time).

The expression "through-transition" of an edge of an oversampled data signal through a sampling position herein denotes an event in which the edge (a transition of the oversampled data signal) moves past the sampling position during a single data period or during different data periods. For example, assuming 3× oversampling, if samples A[0], A[1], and A[2], are obtained during a first data period, samples B[0], B[1], and B[2], are obtained during the next data period, and samples A[0] and B[0] are generated at a first sampling position, a "through-transition" through the first sampling position occurs when an edge of the data signal occurs between the times at which samples A[2] and B[0] are taken, and an edge of the data signal also occurs between the times at which samples B[0] and B[1] are taken, for example as a result of clock and/or data jitter. For another example, also assuming 3× oversampling, if samples A[0], A[1], and A[2], are obtained during a first data period, samples B[0], B[1], and B[2], are obtained during a second data period, samples C[0], C[1], and C[2], are obtained during the 30$^{th}$ data period after the first data period, samples D[0], D[1], and D[2], are obtained during the 31$^{st}$ data period after the first data period, and samples A[0], B[0], C[0] and D[0], are generated at a first sampling position, a "through-transition" through the first sampling position occurs when an edge of the data signal occurs between the times at which samples B[0] and B[1] are taken and an edge of the data signal also occurs between the times at which samples C[2] and D[0] are taken.

By generating and using running tallies of through-transitions (one tally for each sampling position), a "worst" sampling position can be identified and rejected, and the best sampling position (or an adequate sampling position) can be selected from the non-rejected sampling positions. Preferably this is done by rejecting the sampling position (or positions) having the highest count of "through-transitions," and selecting one of the other sampling positions (e.g., the sampling position having the lowest count of "through-transitions"). The highest count of "through-transitions" can be identified at the end of a predetermined counting period, or the counting period can end when one of the "through-transition" counts (for one of the sampling positions) first reaches a predetermined threshold.

In some preferred embodiments of the inventive phase tracking circuit, different phase tracking methods (at least one of which embodies the invention) are used for different types of input data. The circuit has multiple operating modes, and implements a different phase tracking method during each operating mode. The performance of a system that transmits data over a serial link can be greatly increased by including such an embodiment of the inventive phase tracking circuit in the system's receiver. A typical system whose receiver includes such an embodiment of a phase tracking circuit can transmit any of two (or more) types of data over a link (e.g., a TMDS link or other serial link), including one type of data having a "high-transitional" pattern (a pattern having a relatively large average number of transition s per unit time) and another type of data having a "low-transitional" pattern (a pattern having a relatively small average number of transitions per unit time). Such a system preferably includes circuitry for determining whether the received data signal (e.g., received serialized data) has a high-transitional pattern (e.g., a data signal transmitted when a data enable, or "DE," signal is low) or a low-transitional pattern (e.g., a data signal transmitted when a DE signal is high), for implementing a first phase tracking algorithm in response to determining that the data signal has a high-transitional pattern, and for implementing a second phase tracking algorithm in response to determining that the data signal has a high-transitional pattern. Preferably, at least one of the phase tracking algorithms includes the steps of counting through-transitions of edges of the data signal through each oversampling position, rejecting at least one worst oversampling position as a result of such counting, and selecting a non-rejected oversampling position for accomplishing oversampling of the data signal.

Because of the nature of video signaling, DE errors (false high-to-low DE transitions during reception of data or false low-to-high transitions during sync periods) have a greater impact on the video screen than data errors that occur when DE is high. For example, in TMDS encoding, the data signal (e.g., sync pattern) transmitted when DE is low has a large number of transitions per unit time. Since there are a large number of transitions per unit time when DE is low, conventional phase tracking may (in some cases) be performed sufficiently quickly to allow an oversampling clock to be quickly matched with the incoming encoded data and thus to allow recovery of the data (e.g., sync or control bits) with no errors. However, it may not be feasible to perform such conventional phase tracking sufficiently rapidly where the received data pattern has few transitions per unit time (e.g., when DE is high), so that the conventional phase tracking could cause selection of an incorrect sampling position selection for data patterns that have low-transition density (e.g., transition-minimized, in-band, TMDS-encoded data transmitted with DE is high). By identifying whether the data signal has a high-transitional pattern or a low-transitional pattern (e.g., by determining whether the number of transitions per unit time does or does not exceed a predetermined threshold, or employing logic circuitry to identify a high-transitional pattern and/or low-transitional pattern), the phase-tracking algorithm can be dynamically changed to suit the incoming encoded data. For high-transitional data patterns, a phase tracking algorithm that quickly changes sampling position depending on multiple edge information (e.g., a conventional phase tracking algorithm) can be used to select an adequate sampling position. For data having a low-transitional data pattern, it may be preferable to employ an embodiment of the inventive phase tracking algorithm (one that generates and uses counts of "through-transitions") to pick the best sampling position (or an adequate sampling position). Alternatively, the inventive phase tracking algorithm can be employed both for data having a high-transitional data pattern and data having a low-transitional data pattern.

In accordance with the invention, the performance of any blind oversampling system can be greatly improved.

Other aspects of the invention are a receiver that includes any embodiment of the inventive phase tracking (or data sampling) circuit, and a system including any such receiver.

Another aspect of the invention is a method for determining from a number of oversampling positions a selected oversampling position for oversampling a data signal, including the steps of: (a) generating through-transition counts, including a through-transition count for each of the oversampling positions, wherein each of the through-transition counts is a count of through-transitions of edges of the data signal through a different one of the oversampling positions; and (b) identifying a highest one of the through-transition counts, and rejecting each of the oversampling positions having the highest one of the through-transition counts.

Another aspect of the invention is a method for oversampling a data signal, including the steps of: (a) generating through-transition counts, including a through-transition count for each of a number of oversampling positions, wherein each of the through-transition counts is a count of through-transitions of edges of the data signal through a different one of the oversampling positions; (b) identifying a highest one of the through-transition counts, and rejecting each of the oversampling positions having the highest one of the through-transition counts; (c) identifying as a selected oversampling position one of the oversampling positions that is not rejected in step (b); and (d) sampling the data signal at the selected oversampling position. In some embodiments, the selected oversampling position is one of the oversampling positions that has a lowest through-transition count. In some embodiments, step (b) includes the steps of: (e) identifying and rejecting a next-worst one of the oversampling positions; and (f) repeating step (e) until only one of the oversampling positions has not been rejected.

DETAILED DESCRIPTION OF PREFERRED EMBODIMENTS

Figure 2:
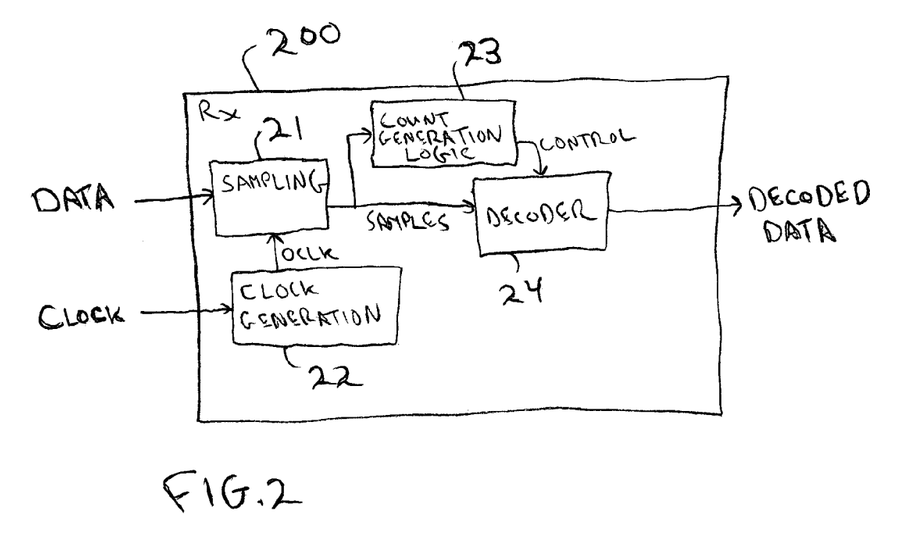
FIG. 2 is a block diagram of a receiver that embodies the invention, and is configured to oversample a data signal received after transmission over a serial link.

FIG. 2 is a block diagram of a receiver that embodies the invention. Receiver 200 of FIG. 2 is configured to oversample a data signal ("DATA") that has propagated over a serial link to receiver 200. The data signal has a bit rate equal to N bits per second. Receiver 200 also receives a clock signal ("CLOCK") that has propagated over the serial link, and includes clock generation circuit 22 which is configured to generate an oversampling clock "OCLK" (having frequency M*N Hz, where M is a small integer) in response to the clock signal CLOCK.

Receiver 200 also includes data sampling circuit 21 which is coupled to receive the data signal DATA and the oversampling clock OCLK. In the case that M=3, circuit 21 is configured to generate three sequences of samples of the data signal: one sequence having a first oversampling position; another sequence having a second oversampling position; and a third sequence having a third oversampling position. In this case, circuit 21 generates three samples (each having a different oversampling position) during each data period of the data signal.

In a typical implementation, the data signal DATA is received over one channel of a TMDS link, and is indicative of a sequence of 10-bit TMDS-encoded characters. In this case, circuit 21 preferably operates (using 3× oversampling) to generate thirty samples (indicative of one TMDS-encoded character) during each ten consecutive data periods.

Count generation logic 23 receives the samples produced by circuit 21 and (in at least one operating mode) generates a running tally (count) of "through-transitions" (as defined above) for each oversampling position. In response to the counts, logic 23 also generates at least one control bit indicative of which of the oversampling positions is a "worst" oversampling position. Preferably this is accomplished in a manner to be described with reference to FIG. 4.

Decoder 24 also receives the samples produced by circuit 21. In response to at least one control signal from logic 23, decoder 24 selects a subset of these samples. In an implementation in which the data signal DATA is indicative of a sequence of 10-bit TMDS-encoded characters, circuit 21 generates a set of thirty samples (indicative of one TMDS-encoded character) during each ten consecutive data periods, and decoder 24 selects ten samples (all having the same oversampling position, which decoder 24 determines to be the "best" oversampling position) from each such set of thirty samples. Decoder 24 decodes the selected samples, thereby generating decoded data (identified as "Decoded Data" in FIG. 2). In an implementation in which the data signal is indicative of a sequence of 10-bit TMDS-encoded characters, and in which decoder 24 selects ten samples from each set of thirty samples received from circuit 21, the Decoded Data generated by decoder 24 are indicative of a sequence of decoded versions of the TMDS-encoded characters (each of which can be an 8-bit data word, or can be sync or control word bits).

Figure 3:
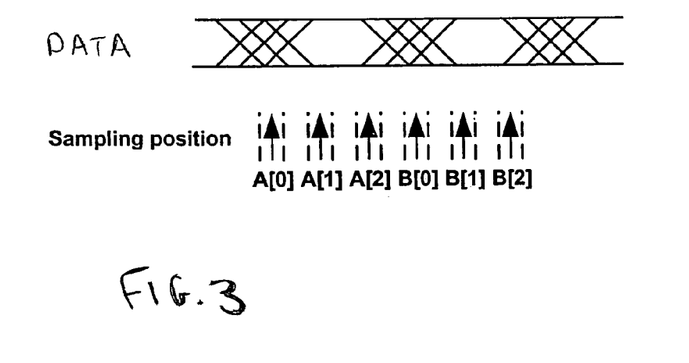
FIG. 3 is a timing diagram of some of the signals asserted during operation of a typical implementation of receiver 200 of FIG. 2.

To allow circuit 21 to perform 3× oversampling (in which case M=3), the oversampling clock ("OCLK") generated by circuit 22 of FIG. 2 can have sampling edges as shown in FIG. 3. In this case, the oversampling clock OCLK has three sets of sampling edges: x[0], x[1], and x[2], where "x" is any positive integer in a predetermined range, and the specific value of "x" denotes a data period of the sampled signal. Each of the three sets of sampling edges is an "oversampling position." In preferred embodiments of FIG. 2 in which thirty samples are obtained over each interval having duration equal to 10 data periods (i.e., three samples are obtained per data period, for 10 data periods), and each set of thirty samples is indicative of a 10-bit TMDS-encoded data character (which can be a 10-bit sync or control character, or a transition-minimized 10-bit code word indicative of data), the range of "x" is $1 \leq x \leq 10$. In FIG. 3 (and in the description below of FIG. 4), the samples for which x=1 (all generated during a first data period) are denoted as A[0], A[1], and A[2], the samples for which x=2 (all generated during the next data period) are denoted as B[0], B[1], and B[2], and so on. Samples A[0] and B[0] are generated at a first oversampling position, samples A[1] and B[1] are generated at a second oversampling position, and samples A[2] and B[2] are generated at a third oversampling position.

Since real implementations of receiver 200 are subject to data and clock jitter, the actual relative phase of the oversampling clock edges and the edges of the data signal are not known and can change either rapidly or slowly. With reference to FIG. 3, an edge of the DATA signal can occur (at a time T1) between the time at which sample A[2] is generated and the time at which sample B[0] is generated. An edge of the DATA signal can also occur (at a different time T2) between the time at which sample B[0] is generated and the time at which sample B[1] is generated. In this case, a "through-transition" has occurred through ("at") the first oversampling position (the sampling position at which samples A[0] and B[0] are generated). If no through-transitions have occurred at the other two oversampling positions, the occurrence of a through-transition at the first oversampling position implies that the first sampling position is not a good sampling position and should be rejected.

With reference again to FIG. 2, in a preferred implementation of receiver 200 in which the data signal is indicative of a sequence of 10-bit TMDS-encoded characters and circuit 21 performs 3× oversampling to generate thirty samples during each ten consecutive data periods, count generation logic 23 receives the samples from circuit 21 and generates a running count of "through-transitions" for each of the three oversampling positions, where "through-transition" is defined above (in the Summary of the Invention). Logic 23 identifies the highest of these three counts of "through-transitions, and asserts control bits to decoder 24 identifying which of the counts is the highest count. Logic 23 preferably identifies the highest count by determining when one of the counts (for a corresponding one of the sampling positions) first reaches a predetermined threshold (e.g., by determining that a counter, which can be a six-bit adder or other adder, has overflowed), and setting a control bit indicating that the corresponding one of the sampling positions is a "worst" sampling position.

At this point, generation of bits indicative of through-transitions for the other sampling positions (the two sampling positions for which the count has not reached the threshold) can continue to allow logic 23 and/or decoder 24 to identify a "next highest" count in some way (such as by identifying which of the two remaining sampling positions first experiences N consecutive through-transitions, where N is a small number, or by continuing to count through-transitions for the two remaining sampling positions until one count reaches a threshold) and to identify a "best" sampling position by rejecting both the "worst" sampling position and the sampling position that corresponds to the "next highest" count. Alternatively, generation of such bits can terminate (in which case decoder 24 can identify a "best" sampling position in some other way).

Alternatively, logic 23 can identify the highest of the three running counts in some other way (e.g., by identifying which of the counts is the highest at the end of a predetermined counting period). Logic 23 can be reset at an appropriate time to begin another running count of through-transitions for each of the three oversampling positions.

In other embodiments, receiver 200 performs 4×-oversampling, 5×-oversampling or another type of oversampling. In these embodiments, too, the worst oversampling position is identified (preferably by generating and processing counts of through-transitions, one count for each oversampling position) and the worst oversampling position is rejected. Optionally also, counts of through-transitions are processed to identify and reject a next-worst oversampling position, and such processing can continue to identify a "best" oversampling position by a continued process of elimination. Alternatively, an adequate oversampling position is identified without rejecting "next worst" oversampling position or a sequence of "next worst" oversampling positions.

With reference again to the 3×-oversampling case, in response to the control bits from logic 23, decoder 24 rejects the sampling position having the highest through-transition count and selects those of the samples (received from circuit 21) that were generated at one of the non-rejected sampling positions. In effect, decoder 23 identifies the sampling position having the highest through-transition count as the "worst" sampling position, and rejects the worst sampling position. In preferred implementations, after decoder 24 rejects the sampling position having the highest through-transition count, decoder 24 responds to additional control bits from logic 23 by rejecting one of the two non-rejected sampling positions that is identified by the additional control bits as a next-worst sampling position, and decoder 24 selects those of the samples (received from circuit 21) that were generated at the one remaining non-rejected sampling position. For example, the additional control bits can identify which of the two sampling positions (that were not initially rejected) first experiences four consecutive through-transitions while the other sampling position (that was not initially rejected) experiences no through-transition, or before the other sampling position first experiences four consecutive through-transitions.

Figure 4:
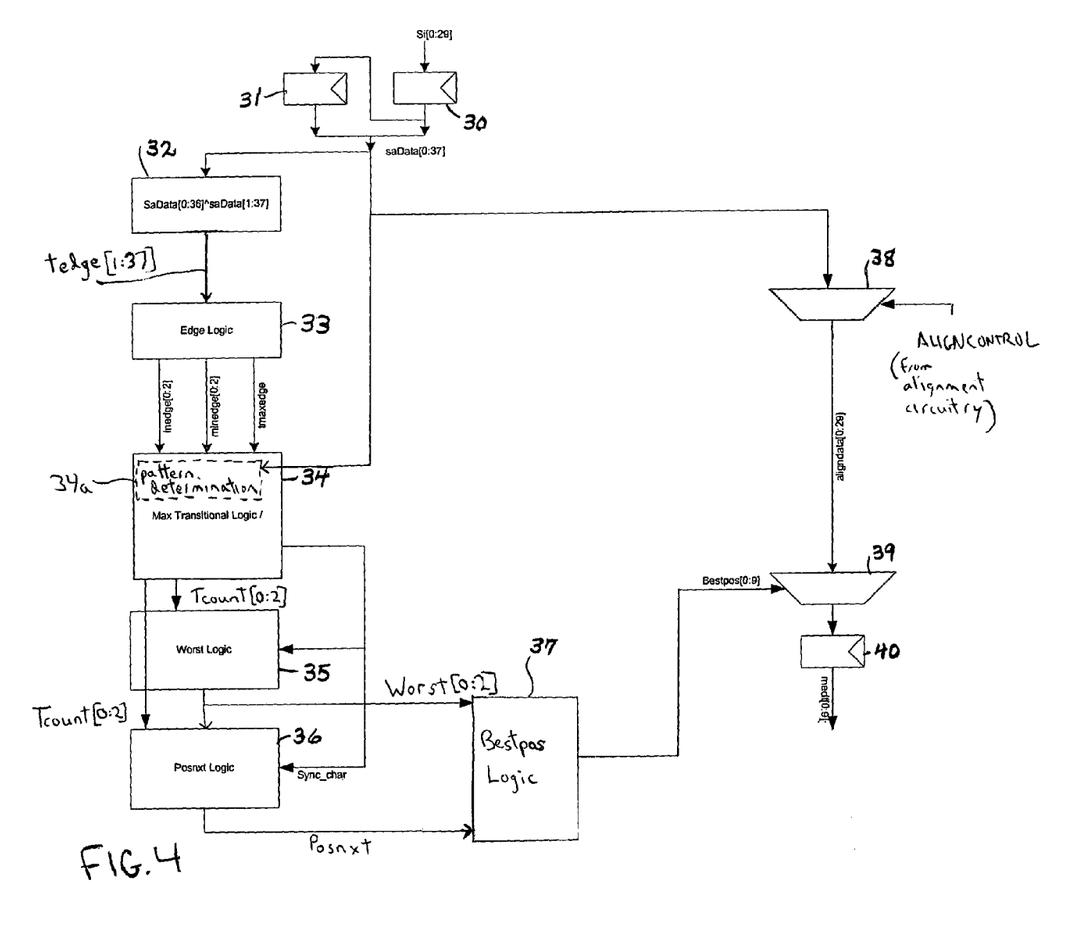
FIG. 4 is a block diagram of a preferred implementation of logic 23 of FIG. 2 and a preferred implementation of a portion of decoder 24 of FIG. 2.

FIG. 4 is a block diagram of a preferred implementation of logic 23 of FIG. 2 and a preferred implementation of a portion of decoder 24 of FIG. 2. Typically, the thirty input samples Si[0:29] received by the FIG. 4 circuit are generated by 3×-oversampling of a TMDS-encoded data signal that has propagated over one channel of a TMDS link, so that the data signal is indicative of a sequence of 10-bit TMDS-encoded characters. Typically, the thirty samples Si[0:29] are indicative of one such TMDS-encoded character, and each group of three of the samples (e.g., Si[0], Si[1], and Si[2]; or Si[27], Si[28], and Si[29]) was generated during a different one of ten consecutive data periods of the data signal.

In the FIG. 4 circuit, thirty input samples Si[0:29] of one TMDS-encoded character are shifted through register 30 with appropriate timing, and are asserted from register 30 to logic circuitry 32 as bits "saData[8:37]" of the thirty-eight bit word "saData[0:37]."

The other eight bits ("saData[0:7]") of each word saData [0:37] asserted to logic 32 are the last eight samples Si[22:29] of the previous TMDS-encoded character. These eight bits are asserted from the output of register 30 to register 31, shifted through register 31 with appropriate timing, and concatenated with the thirty samples of the next TMDS-encoded character to produce the word saData[0:37].

In describing FIG. 4, we shall refer to the samples saData [0], saData[1], saData[2], saData[3], saData[4], saData[5], saData[6], saData[7], saData[8], saData[9], saData[10], saData[11], saData[12], saData[13], . . . , saData[36], and saData[37], as DH[1], DH[2], DI[0], DI[1], DI[2], DJ[0], DJ[1], DJ[2], A[0], A[1], A[2], B[0], B[1], B[2], . . . , J[1], and J[2], respectively. Thus, samples A[0], A[1], and A[2], are obtained during the first data period of the most-recently-sampled TMDS-encoded character, samples J[0], J[1], and J[2], are obtained during the tenth data period of the same TMDS-encoded character, and samples DJ[0], DJ[1], and DJ[2], are obtained during the tenth data period of the previously sampled TMDS-encoded character. The prefix "D" in "DH[0]" (or "DJ[0]" for example) denotes that the sample is a "delayed" sample from the previous TMDS-encoded character. All samples DI[0], DJ[0], A[0], B[0], . . . , and J[0] are generated at a first sampling position, all samples DH[1], DI[1], DJ[1], A[1], B[1], . . . , and J[1] are generated at a second sampling position, and all samples DH[2], DI[2], DJ[2], A[2], B[2], . . . , and J[2] are generated at a third sampling position.

In the following description, the symbol "^" denotes an exclusive OR (XOR) operation, the symbol "|" denotes a nonexclusive OR operation, and the symbol "&" denotes an AND operation.

Logic circuitry 32 is configured to generate bits "tedge[1: 37]" by performing the operation SaData[0:36]^SaData[1: 37], such that each of the bits tedge[1], tedge[2], . . . , and tedge[37] indicates whether a transition of the data signal (being sampled) occurred after generation of an earlier sample (of a pair of consecutively generated samples) and before generation of the later sample of such pair of samples. Thus, tedge[1]=DH[1]^DH[2], tedge[2]=DH[2]^DI[0], tedge [9]=A[0]^A[1], tedge[10]=A[1]^A[2], and so on. For example, tedge[9] is indicative of whether a transition of the data signal occurred between the time at which sample A[0] was generated and the time at which sample A[1] was generated.

Edge logic 33 receives the bits "tedge[1:37]," and in response thereto, generates the bits "inedge[0:2]" and the bit "tmaxedge."

The bit "tmaxedge" is indicative of whether the sampled TMDS-encoded character is likely to be a sync character. Logic 33 generates "tmaxedge" such that:

tmaxedge=(tedge[8]|tedge[9]|tedge[10]|tedge[11]|tedge [12]|tedge[13]) & (tedge[14]|tedge[15]|tedge[16]|tedge[17] |tedge[18]|tedge[19]) & (tedge[20]|tedge[21]|tedge[22] |tedge[23]|tedge[24]|tedge[25]) & (tedge[26]|tedge[27] |tedge[28]|tedge[29]|tedge[30]|tedge[31]) & (tedge[32] |tedge[33]|tedge[34]|tedge[35]|tedge[36]|tedge[37]).

Logic 33 asserts "tmaxedge" to logic unit 34. The manner in which logic unit 34 uses "tmaxedge" is described below.

Logic 33 generates bits "inedge[0:2]" for use by logic unit 34 in generating counts of through-transitions for each over-sampling position. Logic 33 generates bits "inedge[0:2]" such that:

inedge[0]=tedge[3]|tedge[6]|tedge[9]| . . . |tedge[30] |tedge[33]|tedge[36];
inedge[1]=tedge[1]|tedge[4]|tedge[7]| . . . |tedge[28] |tedge[31]|tedge[34]|tedge[37]; and
inedge[2]=tedge[2]|tedge[5]|tedge[8]| . . . |tedge[29] |tedge[32]|tedge[35].

In some implementations, logic 33 also generates bits "minedge[0:2]" in response to the bits "tedge[1:37]," for use by logic 34 in an operating mode (the below-described "first" mode) in which logic 34 implements a conventional phase tracking algorithm (e.g., that described in U.S. Pat. No. 5,905, 769). Logic 33 generates bits "minedge[0:2]" such that:

minedge[0]=(tedge[3] & tedge[6])|(tedge[9] & tedge [12])| . . . |(tedge[27] & tedge[30])|(tedge[33] & tedge[36]);
minedge[1]=(tedge[1] & tedge[4])|(tedge[7] & tedge [10])| . . . |(tedge[25] & tedge[28])|(tedge[31] & tedge[34]); and
minedge[2]=(tedge[2] & tedge[5])|(tedge[8] & tedge [11])| . . . |(tedge[26] & tedge[29])|(tedge[32] & tedge[35]).

The "minedge[0:2]" bits are used in an operating mode in which the samples Si[0:29] are from a transition maximized TMDS character. In this case, because there are a lot of transitions in such a character, logic 34 looks for aligned transitions to allow the FIG. 4 circuit to more quickly determine a best sampling position. The "minedge[0:2]" bits are not used by logic 34 in an operating mode (the below-described "second" mode) in which it implements phase tracking using "through-transition" counts in accordance with the invention.

In some implementations of the FIG. 4 circuit, logic 34 includes pattern determination logic circuitry 34a and operates in two modes. Logic 34 enters and operates in a first mode (for high-transitional data patterns) in response to a determination (by pattern determination logic circuitry 34a) that the current samples Si[0:29] are from a sync character or other transition maximized control character (as indicated by a high level of the below-described "sync character" bit) of the type typically transmitted over a TMDS link when DE is low. In the first mode, logic 34 typically implements any suitable phase tracking algorithm that quickly changes sampling position depending on multiple edge information (e.g., a conventional phase tracking algorithm, such as that described in referenced U.S. Pat. No. 5,905,769). Logic 34 enters and operates in a second mode (for low-transitional data patterns) in response to a determination (by pattern determination logic circuitry 34a) that the current samples Si[0:29] are from neither a sync character nor a transition maximized control character (as indicated by a low level of the below-described "sync character" bit). In the second mode, logic 34 preferably implements the inventive phase tracking algorithm (in a manner described below) using "through-transition" counts to allow units 35, 36, and 37 to pick the best sampling position.

Logic 34 generates the control bit "sync character" to satisfy "sync character"=tmaxedge(t-1) & tmaxedge(t), by "AND ing" together the "tmaxedge" bit for the current TMDS-encoded character ("tmaxedge(t)") with the "tmaxedge" bit for the previous TMDS-encoded character ("tmaxedge(t-1)"). Logic 34 operates in the first mode when the bit "sync character" is high, and operates in the second mode when the bit "sync character" is low. Preferably also, each of logic units 35 and 36 operates in a first mode when logic 34 operates in the first mode, each of logic units 35 and 36 operates in a second mode when logic 34 operates in the second mode, and logic 34 asserts the "sync character" bit to logic units 35 and 36 to control their mode of operation.

We next describe operation of logic units 34, 35, and 36 in the above-mentioned "second" mode in which logic 34 implements an embodiment of the inventive phase tracking algorithm.

In the second mode of operation, logic 34 generates "through-transition" counts in response to the "inedge[0:2]" bits from logic 33.

More specifically, logic 34 retains the "inedge[0:2]" bits generated in response to the samples of the previous TMDS-encoded character (e.g., by storing them temporarily in registers). We denote the retained bit "inedge[0]" that was generated in response to samples of the previous character as "Dinedge[0], the retained bit "inedge[1]" that was generated in response to samples of the previous character as "Dinedge[1], and the retained bit "inedge[2]" that was generated in response to samples of the previous character as "Dinedge[2].

Logic 34 uses the retained bits Dinedge[0], Dinedge[1], and Dinedge[2], with the current bits "inedge[0:2]" (generated in response to samples of the current TMDS-encoded character), to generate the "through-transition" counts.

Each of above-defined bit "inedge[0]" and retained bit Dinedge[0] is indicative of a transition from the first sampling position to the second sampling position, each of above-defined bit "inedge[1]" and retained bit Dinedge[1] is indicative of a transition from the second sampling position to the third sampling position, and each of above-defined bit "inedge[2]" and retained bit Dinedge[2] is indicative of a transition from the third sampling position to the first sampling position.

In the second mode, logic 34 generates a through-transition bit "Tcount[0]" indicative of whether a through-transition across the first sampling position has occurred, a through-transition bit "Tcount[1]" indicative of whether a through-transition across the second sampling position has occurred, and a through-transition bit "Tcount[2]" indicative of whether a through-transition across the third sampling position has occurred.

The bit "Tcount[0]" satisfies: "Tcount[0]"=(inedge[2] & inedge[0])|(Dinedge[2] & inedge[0])|(inedge[2] & Dinedge[0]).

The bit "Tcount[1]" satisfies: "Tcount[1]"=(inedge[0] & inedge[1])|(Dinedge[0] & inedge[1])|(inedge[0] & Dinedge[1]).

The bit "Tcount[2]" satisfies: "Tcount[2]"=(inedge[1] & inedge[2])|(Dinedge[1] & inedge[2])|(inedge[1] & Dinedge[2]).

Logic unit 34 asserts the three bits Tcount[0:2] to each of logic units 35 and 36. Logic unit 35 includes three counters (each of which is preferably a 6-bit counter): a first counter for counting the bits Tcount[0]; a second counter for counting the bits Tcount[1]; and a third counter for counting the bits Tcount[2].

Once per each 30 cycles of the oversampling clock (i.e., once per assertion of a new set of samples Si[0:29] to register 30), the first counter increments its count (a "through-transition" count for the first sampling position) if the current value of Tcount[0] is high, or does not increment its count if the current value of Tcount[0] is low. When the first counter overflows, logic unit 35 sets the control bit "Worst[0]" high to indicate that the first oversampling position is the worst oversampling position.

Once per each 30 cycles of the oversampling clock (i.e., once per assertion of a new set of samples Si[0:29] to register 30), the second counter increments its count (a "through-transition" count for the second sampling position) if the current value of Tcount[1] is high, or does not increment its count if the current value of Tcount[1] is low. When the second counter overflows, logic unit 35 sets the control bit "Worst[1]" high to indicate that the second oversampling position is the worst oversampling position.

Once per each 30 cycles of the oversampling clock, the third counter increments its count (a "through-transition" count for the third sampling position) if the current value of Tcount[2] is high, or does not increment its count if the current value of Tcount[2] is low. When the third counter overflows, logic unit 35 sets the control bit "Worst[2]" high to indicate that the third oversampling position is the worst oversampling position.

Logic unit 35 asserts the control bits Worst[0:2] to logic units 36 and 37. Logic unit 35 can reset its counters in response to a reset signal.

In its second mode of operation, logic unit 36 identifies the "next worst" oversampling position in response to a low-to-high transition of one of the bits "Worst[0:2]" from logic unit 35. In this mode, logic 36 considers only the bits Tcount[0] and Tcount[1] if "Worst[2]" is high, logic 36 considers only the bits Tcount[0] and Tcount[2] if "Worst[1]" is high, and logic 36 considers only the bits Tcount[1] and Tcount[2] if "Worst[0]" is high.

When "Worst [2]" is high, logic unit 36 asserts bit "Posnxt" to unit 37 with a high value in response to receiving four consecutive high values of bit Tcount[0] before receiving four consecutive high values of bit Tcount[1]. This value of bit "Posnxt" indicates that the first sampling position is the "next worst" sampling position. When "Worst [2] is high," logic unit 36 asserts bit "Posnxt" to unit 37 with a low value in response to receiving four consecutive high values of bit Tcount[1] before receiving four consecutive high values of bit Tcount[0]. This value of bit "Posnxt" indicates that the second sampling position is the "next worst" sampling position.

When "Worst [1]" is high, logic unit 36 asserts bit "Posnxt" to unit 37 with a high value in response to receiving four consecutive high values of bit Tcount[0] before receiving four consecutive high values of bit Tcount[2]. This value of bit "Posnxt" indicates that the first sampling position is the "next worst" sampling position. When "Worst [1] is high," logic unit 36 asserts bit "Posnxt" to unit 37 with a low value in response to receiving four consecutive high values of bit Tcount[2] before receiving four consecutive high values of bit Tcount[0]. This value of bit "Posnxt" indicates that the third sampling position is the "next worst" sampling position.

When "Worst [0]" is high, logic unit 36 asserts bit "Posnxt" to unit 37 with a high value in response to receiving four consecutive high values of bit Tcount[1] before receiving four consecutive high values of bit Tcount[2]. This value of bit "Posnxt" indicates that the second sampling position is the "next worst" sampling position. When "Worst [2] is high," logic unit 36 asserts bit "Posnxt" to unit 37 with a low value in response to receiving four consecutive high values of bit Tcount[2] before receiving four consecutive high values of bit Tcount[1]. This value of bit "Posnxt" indicates that the third sampling position is the "next worst" sampling position.

Logic unit 37 identifies the "best" oversampling position in response to the control bits "Posnxt" and "Worst[0:2]". When "Worst [0]" is high and "Posnxt" is high, unit 37 identifies the third sampling position as the "best" sampling position, and asserts bits "Bestpos[0:9]" with corresponding values to multiplexer 39 to cause multiplexer 39 to pass through (to shift register 40) samples from the third sampling position. When "Worst [0]" is high and "Posnxt" is low, unit 37 identifies the second sampling position as the "best" sampling position and asserts bits "Bestpos[0:9]" with corresponding values to multiplexer 39 to cause multiplexer 39 to pass through samples from the second sampling position. When "Worst [1]" is high and "Posnxt" is high, unit 37 identifies the third sampling position as the "best" sampling position, and asserts bits "Bestpos[0:9]" with corresponding values to multiplexer 39 to cause multiplexer 39 to pass through samples from the third sampling position. When "Worst [1]" is high and "Posnxt" is low, unit 37 identifies the first sampling position as the "best" sampling position and asserts bits "Bestpos[0:9]" with corresponding values to multiplexer 39 to cause multiplexer 39 to pass through samples from the first sampling position. When "Worst [2]" is high and "Posnxt" is high, unit 37 identifies the second sampling position as the "best" sampling position, and asserts bits "Bestpos[0:9]" with corresponding values to multiplexer 39 to cause multiplexer 39 to pass through samples from the second sampling position. When "Worst [2]" is high and "Posnxt" is low, unit 37 identifies the first sampling position as the "best" sampling position and asserts bits "Bestpos[0:9]" with corresponding values to multiplexer 39 to cause multiplexer 39 to pass through samples from the first sampling position.

In some implementations, logic unit 37 is configured to handle exception cases (which those of ordinary skill in the art will anticipate). In such implementations, logic unit 37 will typically identify the "best" oversampling position in a manner, slightly different from that described above, that will be apparent to those of ordinary skill in the art.

The samples "saData[0:37]" are asserted (from registers 30 and 31) to inputs of multiplexer 38, as well as to logic unit 32. In response to an alignment control signal ("Aligncontrol"), multiplexer 38 passes through to the inputs of multiplexer 39 a selected subset of thirty consecutive samples ("aligndata[0:29]") of the samples "saData[0:37]." For example, multiplexer 38 can pass through the samples "saData[8:37]" as the samples "aligndata[0:29]" when the alignment control signal indicates that the oversampling clock is phase-aligned with the data signal being sampled. The alignment control signal is indicative of whether the oversampling clock is or is not phase-aligned with the data signal being sampled, and can be generated in any of a variety of well-known ways (e.g., in accordance with a variation on the relevant teaching of U.S. Pat. No. 5,905,769 that will be apparent to those of ordinary skill in the art) by circuitry (not shown) within receiver 200. Multiplexer 39 passes through to shift register 40 a ten-bit subset ("medt[0:9]") of the samples aligndata[0:29] in response to the control bits "Bestpos[0:9]" asserted by logic unit 37. The samples "medt[0:9]" are shifted through register 40 with appropriate timing. As described, the FIG. 4 circuit is designed to ensure that the samples "medt[0:9]" are samples of the data signal generated at the "best" oversampling position.

In implementations of FIG. 4 in which units 34, 35, and 36 are operable in the above-mentioned "first mode" of operation (when not operating in the above-described "second mode" of operation), logic 34 can implement any suitable phase tracking algorithm that quickly changes sampling position depending on multiple edge information (e.g., a conventional phase tracking algorithm, such as that described in referenced U.S. Pat. No. 5,905,769). In the first mode of operation, logic 34 may assert control signal (not shown in FIG. 4) other than the Tcount[0:2] bits, to logic units 35 and 36. In response, unit 35 asserts the control bits "worst[0:2]" (or other control bit or set of control bits not shown in FIG. 4) and unit 36 asserts bit "Posnxt" (or another control bit or set of control bits) to unit 37, and logic unit 37 is configured to respond by selecting a best sampling position from the three available positions and asserting the control bits "Bestpos[0: 9]" to multiplexer 39 to be indicative of the selected best sampling position.

Typically, a receiver that embodies the invention is implemented as an integrated circuit.

In a class of embodiments, the invention is a method for determining from a number of oversampling positions a selected oversampling position for oversampling a data signal, including the steps of: (a) generating through-transition counts, including a through-transition count for each of the oversampling positions, wherein each of the through-transition counts is a count of through-transitions of edges of the data signal through a different one of the oversampling positions; and (b) identifying a highest one of the through-transition counts, and rejecting each of the oversampling positions having the highest one of the through-transition counts.

In another class of embodiments, the invention is a method for oversampling a data signal, including the steps of: (a) generating through-transition counts, including a through-transition count for each of a number of oversampling positions, wherein each of the through-transition counts is a count of through-transitions of edges of the data signal through a different one of the oversampling positions; (b) identifying a highest one of the through-transition counts, and rejecting each of the oversampling positions having the highest one of the through-transition counts; (c) identifying as a selected oversampling position one of the oversampling positions that is not rejected in step (b); and (d) sampling the data signal at the selected oversampling position. In some embodiments, the selected oversampling position is one of the oversampling positions that has a lowest through-transition count. In some embodiments, step (b) includes the steps of: (e) identifying and rejecting a next-worst one of the oversampling positions; and (f) repeating step (e) until only one of the oversampling positions has not been rejected.

It should be understood that while some embodiments of the present invention are illustrated and described herein, the invention is defined by the claims and is not to be limited to the specific embodiments described and shown.

What is claimed is:

1. A method for determining from a number of oversampling positions a selected oversampling position for oversampling a data signal, said method including the steps of:
   (a) generating through-transition counts, including a through-transition count for each of the oversampling positions, wherein each of the through-transition counts is a count of through-transitions of edges of the data signal through a different one of the oversampling positions; and
   (b) identifying a highest one of the through-transition counts, and rejecting each of the oversampling positions having the highest one of the through-transition counts.

2. The method of claim 1, also including the step of:
   (c) identifying as the selected oversampling position one of the oversampling positions that is not rejected in step (b).

3. The method of claim 2, wherein the selected oversampling position is one of the oversampling positions that has a lowest through-transition count.

4. The method of claim 1, also including the steps of:
   (c) identifying a next highest one of the through-transition counts, and rejecting each of the oversampling positions having the next highest one of the through-transition counts; and
   (d) repeating step (c) until only one of the oversampling positions has not been rejected, and identifying as the selected oversampling position said one of the oversampling positions that has not been rejected.

5. The method of claim 1, wherein step (c) includes the steps of:
identifying a next-highest one of the through-transition counts, and rejecting each of the oversampling positions having said next-highest one of the through-transition counts.

6. A method for oversampling a data signal, including the steps of:
(a) generating through-transition counts, including a through-transition count for each of a number of oversampling positions, wherein each of the through-transition counts is a count of through-transitions of edges of the data signal through a different one of the oversampling positions;
(b) identifying a highest one of the through-transition counts, and rejecting each of the oversampling positions having the highest one of the through-transition counts;
(c) identifying as a selected oversampling position one of the oversampling positions that is not rejected in step (b); and
(d) sampling the data signal at the selected oversampling position.

7. The method of claim 6, wherein the selected oversampling position is one of the oversampling positions having a lowest through-transition count.

8. The method of claim 6, wherein step (b) includes the steps of:
(e) identifying a next highest one of the through-transition counts, and rejecting each of the oversampling positions having the next highest one of the through-transition counts; and
(f) repeating step (e) until only one of the oversampling positions has not been rejected.

9. A data sampling circuit, including:
sampling circuitry configured to oversample a data signal to generate samples of the data signal at each of a number of oversampling positions;
logic circuitry coupled to receive the samples and operable to implement phase tracking including by determining from the samples a through-transition count for each of the oversampling positions, where each said through-transition count is a count of through-transitions of edges of the data signal through a different one of the oversampling positions, identifying each of the oversampling positions having a highest one of the through-transition counts as a worst one of the oversampling positions, and identifying one of the oversampling positions other than each said worst one of the oversampling positions as a non-rejected oversampling position; and
selection circuitry coupled to receive the samples and configured to select a subset of the samples such that each sample in the subset has been generated at the non-rejected oversampling position.

10. The data sampling circuit of claim 9, wherein the logic circuitry is configured to identify one of the oversampling positions having a next highest one of the through-transition counts as a next-worst one of the oversampling positions, wherein the non-rejected oversampling position is one of the oversampling positions other than the next-worst one of the oversampling positions.

11. The data sampling circuit of claim 9, wherein the logic circuitry is configured to generate the through-transition counts in response to the samples, wherein the through-transition counts include a through-transition count for each of the oversampling positions and each of the through-transition counts is a count of through-transitions of edges of the data signal through a different one of the oversampling positions.

12. The data sampling circuit of claim 9, wherein the logic circuitry includes:
count generation logic configured to generate the through-transition counts in response to the samples, wherein the through-transition counts include the through-transition count for said each of the oversampling positions; and
worst-position-identifying logic coupled and configured to receive the through-transition counts and to generate a first signal indicative of the worst one of the oversampling positions in response to the through-transition counts.

13. The data sampling circuit of claim 12, wherein the first signal is indicative of which of the through-transition counts first reaches a predetermined threshold.

14. The data sampling circuit of claim 12, wherein the logic circuitry is configured to generate a control signal in response to the first signal and to assert the control signal to the selection circuitry, the control signal is indicative of the non-rejected oversampling position, and the selection circuitry is coupled and configured to select the subset of the samples in response to the control signal.

15. The data sampling circuit of claim 9, wherein the logic circuitry is configured to operate in either one of a first phase tracking mode and a second phase tracking mode, the logic circuitry is operable in the second phase tracking mode to identify each said worst one of the oversampling positions, to generate a control signal indicative of the non-rejected oversampling position, and to assert the control signal to the selection circuitry, wherein the selection circuitry is configured to select the subset of the samples in response to the control signal.

16. The data sampling circuit of claim 15, wherein the logic circuitry includes pattern determination circuitry configured to determine in response to the samples whether the data signal is indicative of data having a high-transitional pattern or a low-transitional pattern, the logic circuitry operates in the first phase tracking mode in response to determination by the pattern determination circuitry that the data signal is indicative of data having the high-transitional pattern, and the logic circuitry operates in the second phase tracking mode in response to determination by the pattern determination circuitry that the data signal is indicative of data having the low-transitional pattern.

17. The data sampling circuit of claim 16, wherein the logic circuitry in the second phase tracking mode is operable to generate the through-transition counts in response to the samples, the through-transition counts include a through-transition count for each of the oversampling positions, and each of the through-transition counts is a count of through-transitions of edges of the data signal through a different one of the oversampling positions.

18. A phase tracking circuit, for use with oversampling circuitry for oversampling a data signal, said oversampling circuitry being operable to generate samples of the data signal at each of a number of oversampling positions, said phase tracking circuit including:
logic circuitry coupled to receive the samples and configured to operate in at least one mode in which it generates through-transition counts from the samples, where each of the through-transition counts is a count of through-transitions of edges of the data signal through a different one of the oversampling positions, identifies at least one of the oversampling positions having a highest one of the through-transition counts as a worst one of the oversampling positions and generates a control signal indicative of one of the oversampling positions other than each said worst one of the oversampling positions.

19. The circuit of claim 18, wherein the logic circuitry is configured to identify one of the oversampling positions having a next highest one of the through-transition counts as a next-worst one of the oversampling positions, and to generate the control signal to be indicative of one of the oversampling positions that is neither said worst one of the oversampling positions nor said next-worst one of the oversampling positions.

20. The circuit of claim 18, wherein the logic circuitry includes:
   count generation logic configured to generate the through-transition counts, wherein the through-transition counts include a through-transition count for each of the oversampling positions and each of the through-transition counts is a count of through-transitions of edges of the data signal through a different one of the oversampling positions; and
   control signal generating logic coupled to receive the through-transition counts and configured to generate the control signal in response to the through-transition counts.

21. The circuit of claim 20, wherein the control signal generating logic includes:
   worst-position-identifying logic configured to assert a first signal indicative of the worst one of the oversampling positions in response to the through-transition counts; and
   additional logic configured to generate the control signal in response to the first signal.

22. The circuit of claim 21, wherein the first signal is indicative of which of the through-transition counts first reaches a predetermined threshold.

23. A phase tracking circuit for use with oversampling circuitry for oversampling a data signal, said oversampling circuitry being operable to generate samples of the data signal at each of a number of oversampling positions, said phase tracking circuit including:
   logic circuitry coupled to receive the samples and configured to be operable in any one of at least a first phase tracking mode and a second phase tracking mode, wherein the logic circuitry is configured to operate in the second phase tracking mode to determine from the samples a through-transition count for each of the oversampling positions, where each said through-transition count is a count of through-transitions of edges of the data signal through a different one of the oversampling positions, to identify at least one of the oversampling positions having a highest one of the through-transition counts as a worst one of the oversampling positions and to generate a control signal indicative of one of the oversampling positions other than said worst one of the oversampling positions.

24. The phase tracking circuit of claim 23, wherein the logic circuitry includes pattern determination circuitry configured to determine in response to the samples whether the data signal is indicative of data having a high-transitional pattern or a low-transitional pattern, the logic circuitry operates in the first phase tracking mode in response to determination by the pattern determination circuitry that that the data signal is indicative of data having the high-transitional pattern, and the logic circuitry operates in the second phase tracking mode in response to determination by the pattern determination circuitry that that the data signal is indicative of data having the low-transitional pattern.

25. The phase tracking circuit of claim 24, wherein the logic circuitry is configured to operate in the second phase tracking mode to identify one of the oversampling positions having a next highest one of the through-transition counts as a next-worst one of the oversampling positions, and to generate the control signal to be indicative of one of the oversampling positions that is neither said worst one of the oversampling positions nor said next-worst one of the oversampling positions.

26. A receiver for use in receiving at least one data signal that has been transmitted over a serial link, said receiver including:
   a data sampling circuit configured to oversample the data signal to generate samples of said data signal at each of a number of oversampling positions, and to select a subset of the samples; and
   additional circuitry coupled and configured to perform at least one operation on the subset of the samples,
   wherein the data sampling circuit includes:
   logic circuitry configured to implement phase tracking including by determining from the samples a through-transition count for each of the oversampling positions, where each said through-transition count is a count of through-transitions of edges of the data signal through a different one of the oversampling positions, identifying each of the oversampling positions having a highest one of the through-transition counts as a worst one of the oversampling positions, and identifying one of the oversampling positions other than each said worst one of the oversampling positions as a non-rejected oversampling position; and
   selection circuitry coupled and configured to select the subset of the samples such that each sample in the subset has been generated at the non-rejected oversampling position.

27. The receiver of claim 26, wherein the logic circuitry is configured to identify one of the oversampling positions having a next highest one of the through-transition counts as a next-worst one of the oversampling positions, wherein the non-rejected oversampling position is one of the oversampling positions other than the next-worst one of the oversampling positions.

28. The receiver of claim 26, wherein the logic circuitry includes:
   count generation logic configured to generate the through-transition counts in response to the samples, wherein the through-transition counts include the through-transition count for said each of the oversampling positions; and
   worst-position-identifying logic coupled and configured to receive the through-transition counts and to generate a first signal indicative of the worst one of the oversampling positions in response to the through-transition counts.

29. The receiver of claim 28, wherein the logic circuitry is configured to generate a control signal in response to the first signal and to assert the control signal to the selection circuitry, the control signal is indicative of the non-rejected oversampling position, and the selection circuitry is coupled and configured to select the subset of the samples in response to the control signal.

30. The receiver of claim 26, wherein the logic circuitry is operable in either one of a first phase tracking mode and a second phase tracking mode, the logic circuitry is operable in the second phase tracking mode to identify each said worst one of the oversampling positions, to generate a control signal indicative of the non-rejected oversampling position, and to assert the control signal to the selection circuitry, wherein the selection circuitry is configured to select the subset of the samples in response to the control signal.

31. The receiver of claim 30, wherein the logic circuitry includes pattern determination circuitry configured to determine in response to the samples whether the data signal is indicative of data having a high-transitional pattern or a low-transitional pattern, the logic circuitry operates in the first phase tracking mode in response to determination by the pattern determination circuitry that the data signal is indicative of data having the high-transitional pattern, and the logic circuitry operates in the second phase tracking mode in response to determination by the pattern determination circuitry that the data signal is indicative of data having the low-transitional pattern.

32. The receiver of claim 31, wherein the logic circuitry in the second phase tracking mode is operable to generate the through-transition counts in response to the samples, the through-transition counts include the through-transition count for said each of the oversampling positions.

33. A system, including:
a serial link;
a transmitter, coupled and configured to assert at least one data signal to the serial link for transmission to a receiver; and
said receiver, coupled to the serial link and configured to receive each said data signal that has been transmitted over the serial link, said receiver including:
a data sampling circuit configured to oversample each said data signal to generate samples of each said data signal at each of a number of oversampling positions, and to select a subset of the samples; and
additional circuitry coupled and configured to perform at least one operation on the subset of the samples,
wherein the data sampling circuit includes:
logic circuitry configured to implement phase tracking including by determining from the samples a through-transition count for each of the oversampling positions, where each said through-transition count is a count of through-transitions of edges of each said data signal through a different one of the oversampling positions, identifying each of the oversampling positions having a highest one of the through-transition counts as a worst one of the oversampling positions, and identifying one of the oversampling positions other than each said worst one of the oversampling positions as a non-rejected oversampling position; and
selection circuitry coupled and configured to select the subset of the samples such that each sample in the subset has been generated at the non-rejected oversampling position.

34. The system of claim 33, wherein the logic circuitry is configured to identify one of the oversampling positions having a next highest one of the through-transition counts as a next-worst one of the oversampling positions, wherein the non-rejected oversampling position is one of the oversampling positions other than the next-worst one of the oversampling positions.

35. The system of claim 33, wherein the logic circuitry includes:
count generation logic configured to generate the through-transition counts in response to the samples, wherein the through-transition counts include the through-transition count for said each of the oversampling positions; and
worst-position-identifying logic coupled and configured to receive the through-transition counts and to generate a first signal indicative of the worst one of the oversampling positions in response to the through-transition counts.

36. The system of claim 35, wherein the logic circuitry is configured to generate a control signal in response to the first signal and to assert the control signal to the selection circuitry, the control signal is indicative of the non-rejected oversampling position, and the selection circuitry is coupled and configured to select the subset of the samples in response to the control signal.

37. The system of claim 33, wherein the logic circuitry is operable in either one of a first phase tracking mode and a second phase tracking mode, the logic circuitry is operable in the second phase tracking mode to identify each said worst one of the oversampling positions, to generate a control signal indicative of the non-rejected oversampling position, and to assert the control signal to the selection circuitry, wherein the selection circuitry is configured to select the subset of the samples in response to the control signal.

38. The system of claim 37, wherein the logic circuitry includes pattern determination circuitry configured to determine in response to the samples whether the data signal is indicative of data having a high-transitional pattern or a low-transitional pattern, the logic circuitry operates in the first phase tracking mode in response to determination by the pattern determination circuitry that the data signal is indicative of data having the high-transitional pattern, and the logic circuitry operates in the second phase tracking mode in response to determination by the pattern determination circuitry that the data signal is indicative of data having the low-transitional pattern.

39. The system of claim 38, wherein the logic circuitry in the second phase tracking mode is operable to generate the through-transition counts in response to the samples, the through-transition counts include the through-transition count for said each of the oversampling positions.

* * * * *